United States Patent
De et al.

(10) Patent No.: US 8,532,036 B2
(45) Date of Patent: Sep. 10, 2013

(54) SYSTEM AND METHOD FOR PROVIDING VOICE OVER INTERNET PROTOCOL QUALITY OF SERVICE SUPPORT IN A WIRELESS COMMUNICATION NETWORK

(75) Inventors: Bhupal S. De, Kirkland, WA (US); Peter Gelbman, Kirkland, WA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 795 days.

(21) Appl. No.: 12/406,677

(22) Filed: Mar. 18, 2009

(65) Prior Publication Data

US 2009/0238135 A1  Sep. 24, 2009

Related U.S. Application Data

(60) Provisional application No. 61/037,435, filed on Mar. 18, 2008.

(51) Int. Cl.
*H04W 72/00* (2009.01)
*H04W 28/16* (2009.01)
*H04W 28/18* (2009.01)
*H04W 28/24* (2009.01)

(52) U.S. Cl.
CPC .............. *H04W 28/16* (2013.01); *H04W 28/18* (2013.01); *H04W 28/24* (2013.01)
USPC .......................................... 370/329; 370/328

(58) Field of Classification Search
CPC ...... H04W 28/16; H04W 28/18; H04W 28/24
USPC .................................................. 370/329, 328
See application file for complete search history.

(56) References Cited

U.S. PATENT DOCUMENTS

| | | | |
|---|---|---|---|
| 2003/0101056 A1* | 5/2003 | Howes ........................ | 704/270 |
| 2004/0008665 A1* | 1/2004 | Johnson et al. ............... | 370/352 |
| 2006/0153079 A1* | 7/2006 | Yoon et al. ................... | 370/235 |
| 2007/0005972 A1* | 1/2007 | Mizikovsky et al. ......... | 713/171 |
| 2007/0053352 A1* | 3/2007 | Corcoran ..................... | 370/389 |
| 2008/0123640 A1* | 5/2008 | Bhatia et al. ................. | 370/389 |
| 2008/0205452 A1* | 8/2008 | Chou ............................ | 370/493 |
| 2008/0253285 A1* | 10/2008 | Lakkakorpi .................. | 370/230 |

* cited by examiner

*Primary Examiner* — Phirin Sam
*Assistant Examiner* — Tarell Hampton
(74) *Attorney, Agent, or Firm* — Michael J. Donohue; Davis Wright Tremaine LLP (57) ABSTRACT

A system for providing Quality of Service (QoS) for voice over internet protocol (VoIP) provides a remote station with the address of an SIP proxy server. The initiates a VoIP service flow by sending an Invite to the proxy server via a base station. If the service flow is authorized, the remote station transmits a request to the base station to establish a service flow having a selected QoS. The proxy server also provides a dynamic address for a voice gateway. Once the service flow is established, the remote station transmits RTP packets to the designated voice gateway using the service flow having the designated QoS level.

23 Claims, 5 Drawing Sheets

FIG.1

| CPE | SIP PROXY SERVER | VOICE GATEWAY |
|---|---|---|
| 192.168.15.2 | 67.69.179.10 | 54.124.147.142 |

| | Comment |
|---|---|
| (5080) Request: REGISTER s → (5080) | SIP: Request: REGISTER sip:clearwirewest.us |
| (5080) Status: 100 Trying ← (5080) | SIP: Status: 100 Trying (0 bindings) |
| (5080) Status: 407 Proxy A ← (5080) | SIP: Status: 407 Proxy Authertication Required (0 bindings) |
| (5080) Request: REGISTER s → (5080) | SIP: Request: REGISTER sip:clearwirewest.us |
| (5080) Status: 100 Trying ← (5080) | SIP: Status: 100 Trying (0 bindings) |
| (5080) Status: 200 Registr ← (5080) | SIP: Status: 200 Registration Sucessful (1 bindings) |
| (5080) Request: INVITE sip → (5080) | SIP/SCP: Request: INVITE sip:2052662432@clearwirewest.us, with session description |
| (5080) Request: INVITE sip → (5080) | SIP/SCP: Request: INVITE sip:2052662432@clearwirewest.us, with session description |
| (5080) Status: 100 Trying ← (5080) | SIP: Status: 100 Trying |
| (5080) Status: 407 Proxy A ← (5080) | SIP: Status: 407 Proxy Authertication Required |
| (5080) Request: ACK sip:20 → (5080) | SIP: Request: ACK sip:2052662432@clearwirewest.us |
| (5080) Request: INVITE sip → (5080) | SIP/SCP: Request: INVITE sip:2052662432@clearwirewest.us with session description |
| (5080) Status: 100 Trying ← (5080) | SIP: Status: 100 Trying |
| (5080) Unknown request: PI ← (5080) | SIP: Unknown request: PING sip:67.69.179.10 |
| (5080) Status: 100 Trying ← (5080) | SIP: Status: 100 Trying |
| (5080) Status: 200 OK ← (5080) | SIP: Status: 200 OK |
| (5080) Status: 180 Ringing ← (5080) | SIP: Status: 180 Ringing |
| (5080) Status: 183 Session ← (5080) | SIP/SCP: Status: 183 Session Progess, with session description |
| (16426) PT=ITU-T G.729, SSR ← (41668) | FTP: PT=ITU-T G.729, SSRC=0xCF87D278, Seq=5999, Time=3001D5444, Mark |
| (16426) PT=ITU-T G.729, SSR ← (41668) | FTP: PT=ITU-T G.729, SSRC=0xCF87D278, Seq=6000, Time=3001D5604 |
| (16426) PT=ITU-T G.729, SSR ← (41668) | FTP: PT=ITU-T G.729, SSRC=0xCF87D278, Seq=6001, Time=300105784 |
| (16426) PT=ITU-T G.729, SSR ← (41668) | FTP: PT=ITU-T G.729, SSRC=0xCF87D270, Seq=6002, Time=300105924 |

⊟ DSX Request/Response TLVs
   ⊟ 145: UL Service Flow Descriptors        Compound
      Type    : 145
      Length  : 108
      Value   : 010400000000202020286030A444154415F42455F554C0501...
    ⊟ Service Flow TLVs
      ⊞ 1  : Service Flow ID                2
      ⊞ 2  : CID                          0x0286 (646)
      ⊞ 3  : Service Class Name          DATA_BE_UL
      ⊞ 5  : QoS Parameter Set Type      See TLV Details
      ⊞ 15 : Fixed vs. Variable-length SDU Indicator    Variable Length SDU
      ⊞ 17 : Target SAID                 0xffff (65535)
      ⊞ 31 : Time Base                   1000 ms
      ⊞ 32 : Paging Preference           No Paging Generation
      ⊞ 37 : SN Feedback Enabled/Disabled    SN Feedback is disabled
      ⊞ 6  : Traffic Priority             0
      ⊞ 7  : Maximum Sustained Traffic Rate  25000000 bps
      ⊞ 28 : CS Specification             Packet, IPv4
      ⊟ 100: IPv4 Settings              Compound
         Type    : 100
         Length  : 6
         Value   : 03040e020001
      ⊟ CS Parameter Encoding Rule TLVs
        ⊟ 3 : Packet Classifier Rule      Compound
           Type    : 3
           Length  : 4
           Value   : 0E020001
        ⊟ Packet Classifier Rule TLVs
          ⊟ 14 : Packet Classifier Rule Index    No TLV Info
             Type    : 14
             Length  : 2
             Value   : 0001
   ⊞ 141: CMAC Tuple                  See TLV Details

FIG.5

SYSTEM AND METHOD FOR PROVIDING VOICE OVER INTERNET PROTOCOL QUALITY OF SERVICE SUPPORT IN A WIRELESS COMMUNICATION NETWORK

BACKGROUND OF THE INVENTION

1. Field of the Invention

The present invention is directed generally to a wireless communication network and, more particularly, to a system and method for providing Voice over Internet Protocol (VoIP) quality of service (QoS) support in a wireless communication network.

2. Description of the Related Art

The use of Voice over Internet Protocol (VoIP) is common and its use is increasing. Standards exist for the use of VoIP in wired networks. The present IEEE 802.16e standards do not have native VoIP support in the Media Access Control (MAC) layer. It does define the mechanisms for Service Flows to provide Quality of Service (QoS) to traffic, but leaves the implementation of decision of traffic selection, marking, and classification up to the vendor. To support QoS for Mobile VoIP or Fixed VoIP, service providers are depending on Mobile Subscriber Station (MSS) vendor implementation in 802.16e.

The 802.16e standards were designed to support multiple QoS classes by having 5 different Service Flow types. Unsolicited Grant Service (UGS) and Extended Real Time Polling Services (ertPS) were created to support VoIP with fixed grant sizes at regular intervals. Best Effort (BE) was designed to carry delay and jitter tolerant data traffic.

The mechanisms to use these Service Flows for various traffic types were left up to vendor implementation. In the Downlink, with traffic flow from the base station to an Access Service Network (ASN) Gateway (GW), the vendor is supposed to map Layer 3 Differentiated Services Code Point (DSCP) markings or Layer 2 User Priority (UP) markings to the right service flow.

This put the onus of classification and marking (L3 DSCP or L2 UP field) of packets on an Application aware device external to the Base Station/ASN GW. This can be achieved by service providers by using an IP multimedia subsystem (IMS) or other Deep Packet Inspection boxes to map Application layer traffic into various Layer 3 or Layer 2 traffic types.

In the Uplink, however, while supporting IP convergence sub-layer (IPCS), the Mobile Station vendor has the onus of doing the Layer 3 DSCP packet marking so that the packets can be sent on the intended WiMAX Service Flow (UGS/ertPS vs. BE). This is a bigger challenge than the downlink direction because of the nature of the devices (e.g., a mobile PC card, residential consumer premise equipment (CPE) or handset) and no standard definition of packet classification.

Therefore, it can be appreciated that there is a need for VoIP QoS support in an uplink and downlink in a wireless communication network. The present invention provides this and other advantages as will be apparent from the following detailed description and accompanying figures.

BRIEF DESCRIPTION OF THE SEVERAL VIEWS OF THE DRAWING(S)

FIG. 2 illustrates a session initiation protocol (SIP) call flow for a separate gateway and VoIP proxy server.

DETAILED DESCRIPTION OF THE INVENTION

This document focuses on the issue of supporting QoS for RTP (Realtime Transport Protocol) packets for VoIP in a 802.16e WiMAX broadband wireless network. This includes both QoS support on both uplink and downlink communications. The examples presented herein use Session Initiation Protocol (SIP) for VoIP support in the network, which is commonly used in communication networks to support VoIP. However, those skilled in the art will appreciate that the principles presented herein are applicable to other communication protocols, such as H.323, or protocols under development. Accordingly, the present teachings are not limited to SIP. The assumption here is VoIP service provider has a few SIP Proxy servers with unique IP addresses and a multitude of Voice Gateways spread geographically with unique non-contiguous IP addresses space.

Figure 1:
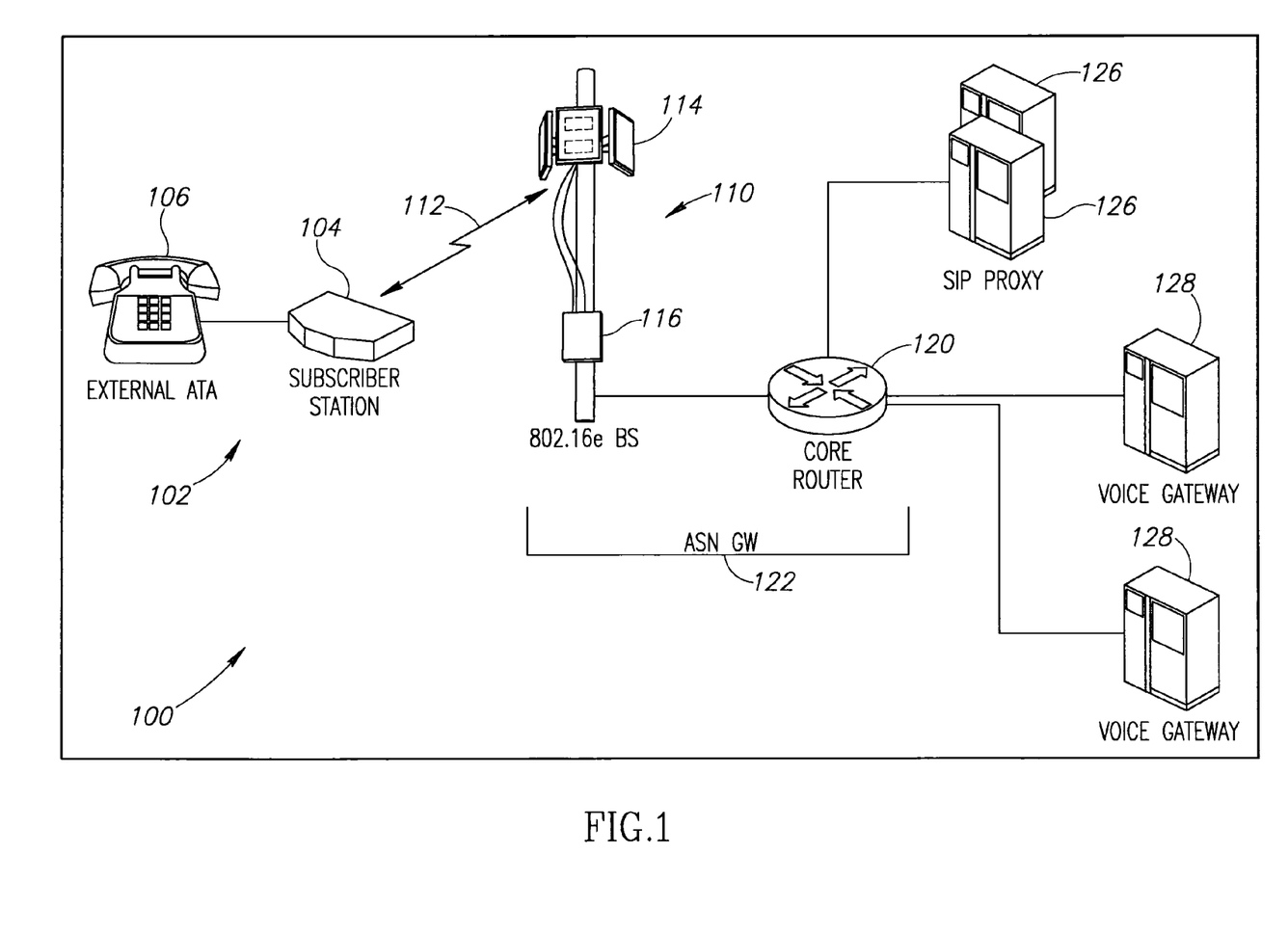
FIG. 1 illustrates a wireless communication architecture for implementation of a system according to the present teachings.

FIG. 1 illustrates an example architecture of a wireless communication system 100 constructed to provide VoIP support in a WiMAX communication. In FIG. 1, a consumer premise equipment (CPE) 102 includes a subscriber station 104 and an external analog terminal adapter (ATA) 106. Those skilled in the art will appreciate that the ATA 106 may include a two wire conventional telephone connection and an Ethernet connection to permit coupling to a subscriber station. The subscriber station 104 includes a transmitter and receiver to allow wireless communication with a Base Station 110 via a wireless communication link 112. Those skilled in the art will appreciate that the external ATA 106 may be combined with a subscriber station 104 such that an integrated mobile station includes the functionality of both units illustrated in FIG. 1. The operation of the subscriber station is well known in the art and need not be described in greater detail herein.

The following description may refer to the CPE 102 as a "mobile station." However, those skilled in the art will appreciate that the principals of the present invention are applicable to wireless communication devices, whether they are mobile or fixed in location, such as is common with the CPE 102. The present invention is applicable to wireless communication devices and is not limited to either mobile or fixed communication devices. For the sake of convenience, the consumer device may also be referred to as the "remote station" or "subscriber station."

The Base Station 110 may have a plurality of antenna elements 114 and transmitters and receivers 116 that operate in accordance with IEEE standard 802.16e. The Base Station 110 communicates with a core router 120. The Base Station 110 and core router 120 form an access service network (ASN) gateway (GW) 122.

As will be described in greater detail below, the core router 120 routes data messages to various portions of the communication system 100, including an SIP proxy server 126 and a plurality of Voice Gateways 128. The operation of the hardware components illustrated in FIG. 1 are well known and need not be described in greater detail except as to the information exchange described below. The following description contains details of the messaging and data carried throughout the system of FIG. 1 to implement the QoS support for VoIP in a WiMAX environment.

FIG. 2 illustrates the SIP call flow to establish a VoIP session. In the example illustrated in FIG. 2, IP addresses are shown for the remote station (e.g., the CPE 102 of FIG. 1), the proxy server 126, and the Voice Gateway 128. The first series of set up messages are transmitted back and forth between the remote station 102 (IP address 192.168.15.2) and the SIP proxy server 126 (IP address 67.69.179.10). The remote station 102 initiates the session by sending a register request message. The remaining exchange of messages between the remote station 102 and the SIP proxy server 126 are conventional messages that need not be described in greater detail herein. However, it should be noted that the port numbers and IP addresses for the media (i.e., RTP packets—Media Gateway) are dynamically assigned during the session set up. FIG. 2 illustrates the port numbers for the remote station 102, the SIP proxy server 126, and the Voice Gateway 128. In the example of FIG. 2, the remote station 102 and the SIP proxy server 126 are using the standard UDP Port 5060 for SIP signaling. Those skilled in the art will appreciate that any port may be used for SIP signaling. However, have been defined for UDP Port 5060 and, in practice, typically use either 5060 UDP, 5061, or 5062 for SIP signaling. However, the principles of the present disclosure are not limited to a specific port.

Following the transmission of a status 183 message from the SIP proxy server 126 to the remote station 102, a VoIP session is established. During the VoIP session, the remote station 102 is assigned Port 16426 and the voice gateway 128 (IP address 54.124.147.142) is assigned Port 41668. FIG. 2 illustrates subsequent transmissions, in the form of multiple real-time transport protocol (RTP) messages transmitted from the remote station 102 directly to the Voice Gateway 128. These RTP messages continue throughout the VoIP session. Thus, establishment of a VoIP session requires communication with both the SIP proxy server 126 and the Voice Gateway 128.

The problem of utilizing the right service flow for the right kind of VoIP traffic can be broken down into the following categories:

1) Traffic Classification Categories:
Differentiating VoIP Traffic from Non VoIP Traffic:

In accordance with current Standards, the 802.16e compliant Base Station 110 uses a Dynamic Service Addition (DSA) message to send traffic classification rules down to the Subscriber Station (i.e., the CPE 102). These rules for the IP convergence sub-layer are based on Source/Destination IP address range, Source/Destination Port number range and DSCP value range. The subscriber station 102 is required to use these rules to send traffic on the uplink on the right service flow. While these rules provide flexibility they are not adequate to provide QoS to VoIP RTP packets.

As discussed above with respect to FIG. 2, the SIP uses dynamic port numbers for the voice gateway for RTP packets so a port-based rule specified by the 802.16e standard is insufficient to provide QoS for VoIP. Furthermore, the Destination and Source IP address of the Voice Gateway is dynamically negotiated between the SIP endpoint and the SIP Proxy server 126 based on the call number. For example, in North America, telephones use the North American numbering plan. The first six digits of the ten digit North American telephone number refer the area code and local exchange carrier and may be expressed in the format NPA-NXX. Using this example, the Destination and Source IP addresses of the Voice Gateway 128 is dynamically negotiated between the SIP end point and the SIP Proxy server 126 based on the NPA-NXX of the called number or other rules that the VoIP service provider may have provisioned in the SIP Proxy server. Manageability of destination IP based rules in each Base Station 110 becomes an issue also as newer Voice gateways are likely to be added as VoIP infrastructure expands. As will be described in greater detail below, the system designed in accordance with the present teachings includes a mechanism for downloading updated infrastructure information to the remote station to accommodate the addition of new SIP proxy servers 126 and new Voice Gateways 128.

Another issue which arises from using the destination IP address based rule is that there could be a very large number of VoIP gateways 128 within the system 100 and it is not possible to have a rule corresponding to each VoIP gateway in the WiMAX Base Station 110. While DSCP values of the RTP packets could be made unique by static configuration, there is no guarantee that other data services would not be marking the packets with similar DSCP marking. That is, data services other than the VoIP service could mark data packets with similar DSCP markings, resulting in unacceptable errors. Therefore, static configuration of the DSCP values in the RTP packets is not an acceptable solution.

Differentiating Managed Revenue Generating VoIP from Unmanaged VoIP:

The second requirement which a service provider requires is separation of managed VoIP vs. unmanaged VoIP. As used herein, the term "managed VoIP" refers to VoIP services that are provided by a service provider for revenue generating customers. That is, managed VoIP are VoIP services for subscribers of the service provider. In contrast, the term "unmanaged VoIP" refers to VoIP services for a non-subscriber. From a business perspective, it is important for any service provider to provide best QoS possible to revenue generating VoIP traffic. When both managed and unmanaged VoIP traffic utilize the same UDP port number for SIP (Destination Port 5060/5061/5062) then the only way to distinguish between managed VoIP traffic and unmanaged VoIP traffic is to use the IP address of the SIP proxy server 126 or the domain name system (DNS) name of the managed SIP proxy server. However, if the VoIP service provider's architecture has separate SIP proxy server 126 and VoIP Gateways 128, then the destination IP address of the VoIP gateways are difficult to determine.

2) Device Type Category:
Residential Gateway with External ATA:

When the WiMAX CPE has a external ATA connected to it for VoIP service, packet classification based on DSCP is not reliable since another device connected to the WiMAX CPE could be using the same DSCP packet tagging either intentionally (e.g., for gaming or other user applications) or due to misconfiguration.

Handheld Device/PC Card/USB WiMAX Device with Soft VoIP Client:

When the WiMAX device is a PC card or USB device connected to a PC the same issue of reliably marking the DSCP value comes into play. Another application running on the PC could be marking the IP packets with the same DSCP as the VoIP RTP packets making the selection of Service Flows based on DSCP making unreliable.

Residential Gateway with Built in ATA:

When the WiMAX CPE has an internal ATA connected to it for VoIP service packet classification is easier to do and all packets originating from the local ATA port should be tagged and put on the desired QoS enabled service flow.

Proposed Solution

The solution presented below is a method to provide VoIP QoS in a WiMAX wireless environment based on SIP signaling decode. The solution to providing QoS to VoIP RTP packets over the air in the 802.16e radio access network (RAN) is described in two parts. It should be noted that this technique provides a mechanism for providing uplink QoS to RTP packets by mapping RTP packets to ertPS Service Flows. This technique also provides a mechanism for downlink QoS by sending an IP Classifier rule to the 802.16e base station (i.e. the base station 110 in FIG. 1), which is used by the base station to map IP/UDP/RTP packets to the proper ertPS downlink service flow.

Part 1) Configuration of SIP Proxy Address in the WiMAX CPE:

The first part is a configuration parameter in the WiMAX CPE 102 (See FIG. 1) to specify an address for the SIP Proxy server 126. The purpose of this field is to provide the capability to differentiate the SIP proxy server 126 of a particular service provider from any generic non-revenue generating SIP owned by other service providers. Such a configuration could be done either by a simple flat file downloaded from Motorola EMS. Alternatively a TFTP server could be in place for configuration download or even OMA/DM could be an alternative to push down such an configuration. In one exemplary implementation, the 802.16e standards allow this value to be placed in the DSA message by adding a new Type Length Value (TLV) for SIP proxy support.

A notable advantage of having the SIP Proxy servers address downloadable is that updates may be dynamically performed in case the VoIP service providers SIP proxy address changes in the future for any reason. Furthermore, if the WiMAX Network Access Provider (NAP) chooses to implement an open network and provide QoS to third party VoIP providers for a small fee, it can be implemented by adding the SIP proxy server addresses in this dynamic configuration option. Thus, the CPE 102 is configured to store a relatively short list containing the IP address for one or more SIP Proxy servers 126.

Part 2) Remote Station SIP/SDP Decoding Capability:

The second component required to support QoS for RTP packets is a SIP/SDP decoder in the CPE 102 (See FIG. 1) to look into the signaling message to track the UDP destination port number for RTP packets being generated from the subscriber station.

Any time the SIP decoder process, which listens on UDP port 5060, sees an SIP Invite in any direction (i.e., from the user at the remote station or from the base station), it initiates a DSA request to the BS 110 (See FIG. 1) on completion of SIP signaling. The DSA request is initiated only if the SIP proxy address configured in the WiMAX CPE 102 matches the Invite from SIP Proxy or to the SIP Proxy. A match between the SIP Proxy address in the WiMAX CPE 102 and the SIP Invite or Register indicates that the VoIP request is from a subscriber to the network service. The BS 110 responds with a DSA RSP as provisioned by the Service Provider for that particular user. If there is no match between the SIP Proxy address and the Invite from the SIP Proxy, it indicates that the VoIP request comes from a non-subscriber. In this event, rather than providing a QoS level, such as ertPS or UGS, the service flow would be designated as Best Efforts.

If the SIP Proxy addresses in the WiMAX CPE 102 matches the SIP Invite or Register to the proxy server or the SIP Invite from the proxy server, then the remote station maps all RTP packets for that service flow onto the QoS enabled ertPS or UGS service flow for transport across the 802.16e RAN.

Figure 3:
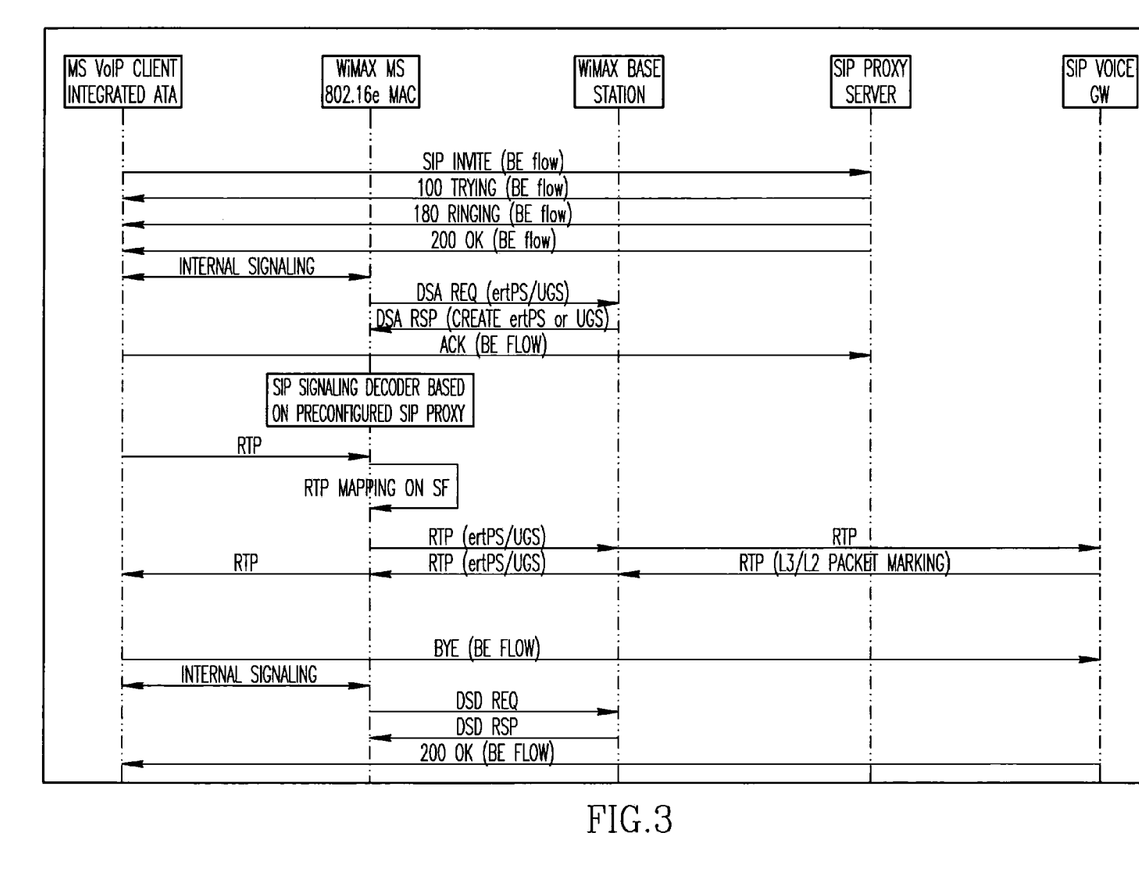
FIG. 3 illustrates the call flow for VoIP SF selection using an integrated analog terminal adapter (ATA).
Figure 4:
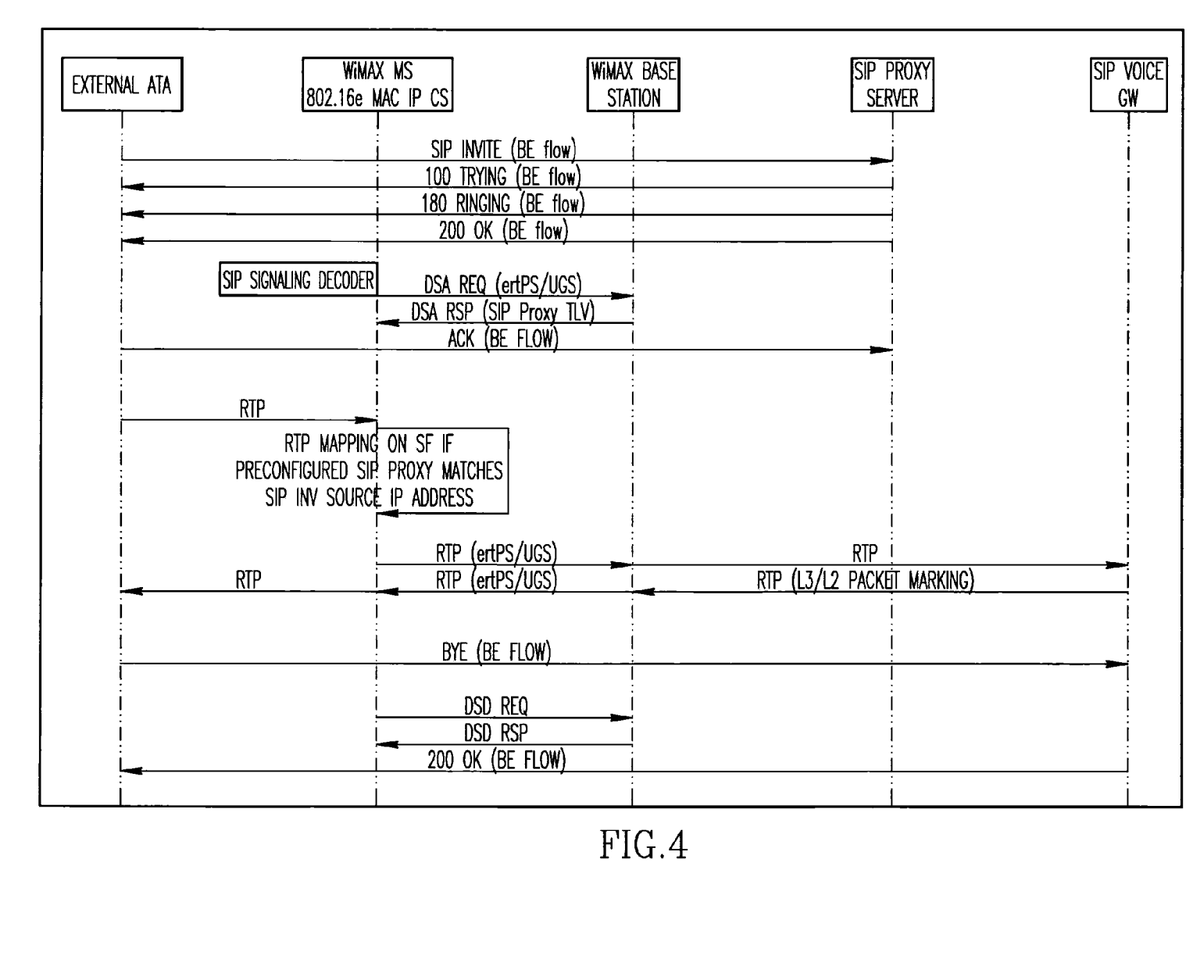
FIG. 4 illustrates the call flow for VoIP setup using an external ATA.

A schematic lattice diagram of FIG. 3 shows an example exchange of messages for an integrated ATA/soft client VoIP SF selection. FIG. 4 shows a similar exchange of messages for an external ATA RTP mapping to a WiMAX SF. Those skilled in the art will appreciate that the messaging flow illustrated in FIGS. 3 and 4 are merely examples of the many possible SIP call flows. The concepts illustrated therein can be readily extended to other types of protocols, such as H.323 or even to other SIP calls with slightly different messaging. Those skilled in the art will appreciate that variations in the SIP messaging can be readily implemented. Accordingly, the present disclosure is not limited by the specific SIP call flow illustrated in FIGS. 3 and 4.

The advantages of such a solution to provide native support of VoIP extensions in WiMAX are enormous. For example, in an IMS based infrastructure, the BS 110 (See FIG. 1) can be updated with the Service Providers SIP proxy address automatically by signaling between IMS server and the BS. Such an extension could even be integrated into the AAA profile per subscriber. In this manner, the subscriber can choose a VoIP provider partner of the WiMAX VoIP Provider with a simple update of AAA record.

For non IMS based infrastructure a configuration change only at the EMS/AAA with no additional signaling required can be used to implement the system described herein.

As VoIP service provider's infrastructure grows by adding new Voice Gateways, the WiMAX service provider would not have to change rules and policies for each new added Voice Gateway 128 as long as the proxy server (e.g., the SIP proxy serve 126 in FIG. 1) is still the same.

If the VoIP service provider chooses to peer with other VoIP providers, this mechanism allows QoS to be provided for those gateways also without any change in the WiMAX Service provider's infrastructure.

This two-part solution for native SIP support on WiMAX would be very beneficial to the non-Session Border Controller based solution. Decoding SIP at the subscriber station makes it adaptable to the separate SIP proxy and gateway architecture.

Figure 5:
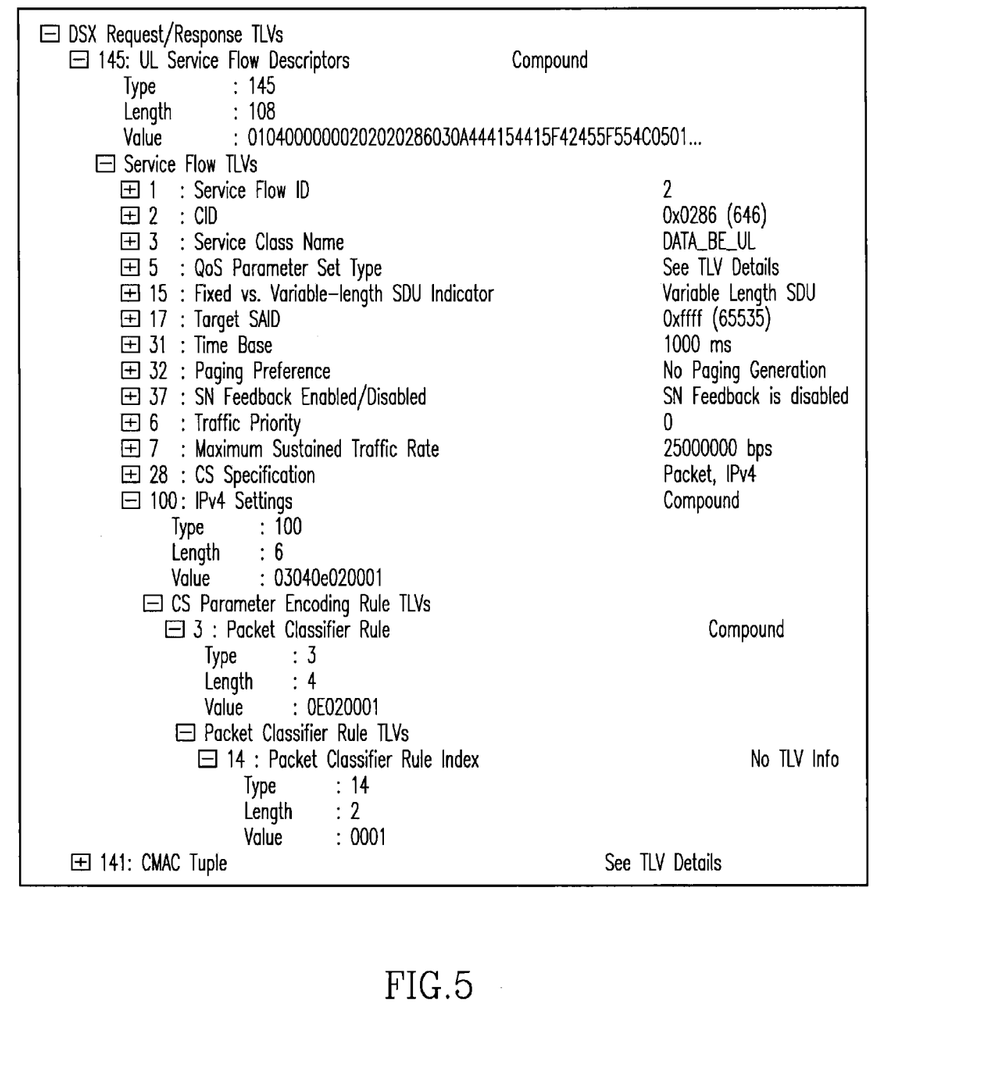
FIG. 5 illustrates an example of messaging communication between a base station and a wireless subscriber to provide updated system architecture information to a remote subscriber.

Native Support of VoIP on WiMAX:

Although not essential for satisfactory implementation of the techniques described herein, an optional implementation in the standards would readily provide native support of VoIP on WiMAX. The SIP Proxy server address, which is configured using TFTP/EMS or OMA/DM could just be put in one of the WiMAX TLV's, as shown in FIG. 5. The inclusion of configuration data from multiple protocols into a single WiMAX TLV eliminates the need to have extra configuration management for VoIP. Also the benefit would be user cannot change the configuration data. That is, an end user cannot surreptitiously gain control of system resources and unfairly allocate those resources. Additional line scan be added to the sample TLV of FIG. 5 to provide updated data to the remote station. For example, the system illustrated in FIG. 1 may be altered to add an additional SIP proxy server. The example of FIG. 5 could be altered to include the IP address of the new proxy server 126. This data would be pushed down to the remote station.

GLOSSARY OF TERMS

AAA Authentication Authorization Accounting server
ASN Access Service Network
ATA Analogue Terminal Adapter
BE Best Efforts
BS Base Station
CPE Consumer Premise Equipment DSA Dynamic Service Addition
DSCP Differentiated Services Code Point
DSD Dynamic Service Flow deletion
EMS Element Management System
ERTPS Extended Real-time Polling Services
GW Gateway
IMS IP multimedia subsystem
MSS Mobile Subscriber Station
OMA/DM Open Mobile Alliance (OMA) for Device Management (DM)
RAN Radio Access Network
RTP Real-time Transport Protocol
SDP Session Description Protocol
SF Service Flow
SIP Session Initiation Protocol
TFTP Trivial File Transfer Protocol
TLV Type Length Value
UDP User Datagram Protocol
UGS Unsolicited Grant Service The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for providing a selected quality of service (QoS) on a voice call in a data packet communication network comprising:
    a base station communicatively coupled to the communication network;
    a wireless communication device operable by a user and configured to communicate with the base station using a voice over Internet protocol (VoIP);
    a router coupled to the base station and configured to route messages to and from the base station; and
    a proxy server coupled to the router and configured to communicate with the base station via the router, the proxy server having a unique network address wherein the wireless communication device is configured to store a downloadable configuration parameter that provides the unique network address of the proxy server prior to a request for a VoIP communication session and the proxy server is further configured to detect a request for the VoIP communication session from the wireless communication device via the base station and router, the wireless communication device being configured to provide the base station with the unique network address of the proxy server.

2. The system of claim 1 wherein the wireless communication device comprises an integrated analog terminal adapter.

3. The system of claim 1 wherein session rules provided by the wireless communication device comprise address and port information for a voice gateway with which the wireless communication device will communicate during the communication session.

4. The system of claim 1 wherein the specified QoS level is applied to an uplink from the wireless communication device to the base station and on a downlink from the base station to the wireless communication device.

5. The system of claim 1 wherein the wireless communication device request for the communication session comprises an Invite communication message with a session initiation protocol (SIP) proxy server and, if the SIP proxy server address matches the unique network address of the proxy server provided to the base station by the wireless communication device, the wireless communication device being configured to map data onto a service flow having a QoS greater than Best Efforts during the communication session.

6. The system of claim 5 wherein the wireless communication device transmits a plurality of data packets to voice gateway using a voice gateway address provided to the wireless communication device by the proxy server.

7. The system of claim 6 wherein the wireless communication device transmits a plurality of RTP data packets to the voice gateway using the provided voice gateway address.

8. The system of claim 5 wherein if the unique network address of the proxy server does not match the SIP proxy server address, the wireless communication device is further configured to map data onto a service flow having a Best Efforts QoS during the communication session.

9. The system of claim 5 wherein the wireless communication device transmits a plurality of data packets to a voice gateway using an Unsolicited Grant Service (UGS) QoS.

10. The system of claim 5 wherein the wireless communication device transmits a plurality of data packets to a voice gateway using an Extended Real Time Polling service (ertPS) QoS.

11. The system of claim 1 wherein the wireless communication device request for the communication session comprises an address of the proxy server and, if the proxy server address matches an authorized proxy server address, providing an authorized subscriber QoS level with which the wireless communication device will communicate during the communication session.

12. The system of claim 11 wherein the wireless communication device request for the communication session comprises an address of the proxy server and, if the proxy server address does not match an authorized proxy server address, providing an unauthorized subscriber QoS level with which the wireless communication device will communicate during the communication session.

13. A method for providing a selected quality of service (QoS) for a wireless communication device for a voice call in a data packet communication network comprising:
   a proxy server receiving a request for a communication session transmitted from the wireless communication device to a base station using a Voice over Internet Protocol (VoIP), the proxy server have a unique network address provided to the wireless communication device;
   identifying, within the request for the communication session, a request for a voice communication over a communication network, the request including data to permit the identification of the wireless communication device as a subscriber of the voice call service provider or as a non-subscriber;
   using the proxy server to dynamically negotiate source and destination addresses for a voice gateway with which the wireless communication device will communicate;
   providing a set of rules to a base station to configure the base station for the establishment of flow rules for communications between the base station and a wireless communication device; and
   establishing a communication link with the wireless communication device using a QoS protocol having a higher QoS level than a Best Efforts QoS if the data to permit the identification indicates that the wireless communication device is a subscriber."

14. The method of claim 13 wherein the flow rules comprise a port address for communications with the wireless communication device and an IP address of the wireless communication device.

15. The method of claim 13 wherein the request for the communication session comprises an address of the proxy server designated by a service provider to process requests for voice communication.

16. The method of claim 13 wherein the request for the communication session comprises an address of the proxy server, the method further comprising determining if address of the proxy server matches a proxy server address designated by a service provider to process requests for voice communication and, if the address of the proxy server is determined to match a proxy server address designated by a service provider, specifying an Unsolicited Grant Service (UGS) QoS level.

17. The method of claim 13 wherein the request for the communication session comprises an address of the proxy server, the method further comprising determining if address of the proxy server matches a proxy server address designated by a service provider to process requests for voice communication and, if the address of the proxy server is determined to match a proxy server address designated by a service provider, specifying an Extended Real Time Polling Services (ertPS) QoS level.

18. The method of claim 13, further comprising specifying a Best Efforts (BE) QoS level if the data to permit the identification indicates that the wireless communication device is a non-subscriber.

19. The method of claim 13 wherein the request for the communication session comprises an address of the proxy server and, if the proxy server address matches an authorized proxy server address, the method further comprising providing an address of the voice gateway with which the wireless communication device will communicate during the communication session.

20. The method of claim 19, further comprising transmitting a plurality of data packets from the wireless communication device to the voice gateway using the provided voice gateway address.

21. The method of claim 19, further comprising transmitting a plurality of RTP data packets from the wireless communication device to the voice gateway using the provided voice gateway address.

22. The method of claim 19 wherein the proxy server address matches an authorized proxy server address, the method further comprising generating a request for service that designates the specified QoS protocol associated with the communication session.

23. The method of claim 13 wherein the request for a communication session comprises a proxy server address stored within the wireless communication device, the method further comprising transmitting an updated proxy server address to the wireless communication device.

* * * * *